(12) United States Patent
Yanagibayashi

(10) Patent No.: US 11,977,056 B2
(45) Date of Patent: May 7, 2024

(54) LIQUID DELIVERY PUMP AND LIQUID CHROMATOGRAPH

(71) Applicant: SHIMADZU CORPORATION, Kyoto (JP)

(72) Inventor: Jun Yanagibayashi, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 393 days.

(21) Appl. No.: 17/623,771

(22) PCT Filed: Jul. 9, 2019

(86) PCT No.: PCT/JP2019/027220
§ 371 (c)(1),
(2) Date: Dec. 29, 2021

(87) PCT Pub. No.: WO2021/005728
PCT Pub. Date: Apr. 14, 2021

(65) Prior Publication Data
US 2022/0244222 A1 Aug. 4, 2022

(51) Int. Cl.
*G01N 30/02* (2006.01)
*G01N 30/32* (2006.01)
*G01N 30/52* (2006.01)

(52) U.S. Cl.
CPC ....... *G01N 30/02* (2013.01); *G01N 2030/027* (2013.01); *G01N 2030/326* (2013.01); *G01N 2030/522* (2013.01)

(58) Field of Classification Search
CPC ............. G01N 30/02; G01N 2030/027; G01N 2030/326

(Continued)

(56) References Cited

U.S. PATENT DOCUMENTS 4,797,207 A * 1/1989 Honganen .............. G01N 30/34
417/18
5,245,828 A * 9/1993 Nakamura ............ E02F 9/2232
91/518

(Continued)

FOREIGN PATENT DOCUMENTS

JP    H0267478 A  *  8/1988
JP    1-056976 A       3/1989
JP    2-067478 A       3/1990

OTHER PUBLICATIONS

Translation of JP-H0267478-A (provided by Applicant) (Year: 1988).*

(Continued)

*Primary Examiner* — Nathaniel T Woodward
(74) *Attorney, Agent, or Firm* — Renner, Otto, Boisselle & Sklar, LLP

(57) ABSTRACT

A liquid delivery pump includes a primary plunger pump, a secondary plunger pump fluidly connected in series downstream of the primary plunger pump, and a pressure sensor that detects a system pressure. The liquid delivery pump further includes a liquid delivery control part configured to execute first constant pressure control in a first constant pressure control term and to execute second constant pressure control in a second constant pressure control term. The first constant pressure control term is a term, which is in a liquid delivery cycle consisting of the primary discharge process and the secondary discharge process, in which the primary discharge process is executed, the second constant pressure control term is a part of a term in which the secondary discharge process is executed, and the second constant pressure control term is including a term that is continuous after the first constant pressure control term.

7 Claims, 11 Drawing Sheets

(58) Field of Classification Search
USPC .......................................................... 73/61.52
See application file for complete search history.

(56) References Cited

U.S. PATENT DOCUMENTS

| | | | |
|---|---|---|---|
| 5,637,208 A | 6/1997 | Dourdeville | |
| 5,664,937 A * | 9/1997 | Takahashi | G05D 13/32 |
| | | | 417/42 |
| 8,226,370 B2 * | 7/2012 | Wu | F15B 21/08 |
| | | | 417/539 |
| 2007/0084766 A1 * | 4/2007 | Ishii | G01N 30/32 |
| | | | 210/87 |
| 2008/0206067 A1 | 8/2008 | De Corral | |
| 2010/0275678 A1 | 11/2010 | Herzog | |
| 2010/0288027 A1 * | 11/2010 | Ishii | G01N 30/32 |
| | | | 73/61.56 |
| 2012/0216886 A1 | 8/2012 | Herzog | |

OTHER PUBLICATIONS

International Search Report for corresponding Application No. PCT/JP2019/027220, mailed Oct. 8, 2019.
Written Opinion for corresponding Application No. PCT/JP2019/027220, mailed Oct. 8, 2019 (English machine translation).

* cited by examiner

LIQUID DELIVERY PUMP AND LIQUID CHROMATOGRAPH

TECHNICAL FIELD

The present invention relates to a liquid delivery pump used in an analysis device such as a high performance liquid chromatograph and a liquid chromatograph including the liquid delivery pump.

BACKGROUND ART

In a liquid chromatograph, a mobile phase such as water or an organic solvent is pumped at a high pressure in an analysis channel by a liquid delivery pump. A sample to be analyzed is introduced into a mobile phase by a sample injector and mixed, and transferred to a separation column. In the separation column, each component substance in the sample is retained for different periods of time depending on the affinity with the mobile phase and the separation column, and then eluted from the separation column. Component substances sequentially eluted from the separation column are detected by a detector. The mobile phase and each component substance that have passed through the detector are discharged to the drain. A signal obtained by the detector is transferred to a data processing device, and qualitative processing and quantitative processing of each component substance are performed.

As a method of delivering a mobile phase in an analysis device such as a liquid chromatograph, there are methods such as an isocratic method, a low-pressure gradient method, and a high-pressure gradient method. The isocratic method is a method in which one type of mobile phase is delivered by one liquid delivery pump. The low-pressure gradient method is a method that realizes a desired mobile phase composition by sequentially delivering a plurality of types (usually, four types at the maximum) of mobile phases using a proportional solenoid valve and one liquid delivery pump. The high-pressure gradient method is a method of realizing a desired mobile phase composition by causing one liquid delivery pump to correspond to each of a plurality of types (usually, two types at the maximum) of mobile phases and merging the mobile phases at an outlet of each liquid delivery pump (and before a sample injector). In particular, a liquid delivery device capable of realizing liquid delivery in the high-pressure gradient method by two types of mobile phases as one device is called a binary pump.

In a liquid chromatograph, controlling a mobile phase to have a desired composition is an essential requirement for ensuring reliability of an analysis result. In particular, in the high-pressure gradient method, the flow rate stability of the liquid delivery pump directly affects the reproducibility of a mobile phase composition. Further, depending on a type of the detector, pulsation of pressure and the like and a composition of a mobile phase may become noise and be sensed.

For these reasons, a liquid delivery pump of a liquid chromatograph has been required to have high flow rate stability (low pulsation performance). In order to deliver a low flow rate (for example, several mL/min or less) used in a liquid chromatograph at a high pressure (for example, several tens of MPa), a plunger pump is generally employed as a liquid delivery pump. Then, since liquid delivery is intermittent with a single plunger pump, a liquid delivery pump of a double plunger system in which two plunger pumps are connected in series or in parallel and operated in a complementary manner is often used.

PRIOR ART DOCUMENTS

Patent Documents

Patent Document 1: U.S. Pat. No. 5,637,208 A
Patent Document 2: US 2012/216886 A1
Patent Document 3: US 2010/275678 A1
Patent Document 4: US 2008/206067 A1
Patent Document 5: U.S. Pat. No. 5,664,937 A

SUMMARY OF THE INVENTION

Problems to be Solved by the Invention

In a liquid delivery pump of the double plunger system, at least one plunger pump performs a pre-pressurizing process for increasing a pressure in a pump chamber to a system pressure or a pressure in the vicinity of the system pressure after a liquid suction process is completed. If the pre-pressurizing in the pump chamber is insufficient in this pre-pressurizing process, a liquid delivery flow rate is lost in a subsequent discharge process. Conversely, if the pre-pressurizing is excessive, the liquid delivery flow rate is also excessive. In either case, the liquid delivery stability is impaired. In order to solve such a problem, a technique of accurately controlling the operation of the plunger in the pre-pressurizing process by measuring a pressure in the pump chamber during the pre-pressurizing process and comparing the measured value with a measured value of the system pressure is disclosed (see Patent Document 1).

As a secondary factor of impairing the liquid delivery stability of the liquid delivery pump, a temperature of a mobile phase in the liquid delivery pump is non-equilibrium and non-stationary. The mobile phase is at room temperature in the suction process, but has a temperature increased by being adiabatically compressed in the pre-pressurizing process, and is cooled by exchanging heat with surrounding members such as a pump head and a pipe in a subsequent discharge process. Such a periodic temperature change of the mobile phase appears as a periodic variation of a liquid delivery flow rate through thermal expansion. Such a phenomenon is called thermal effect pulsation. As a method for solving this, performing heat compensation by performing constant pressure control of liquid delivery operation of the liquid delivery pump only in a specific term (mainly, a term during the discharge process of the plunger pump that has performed the pre-pressurizing process) of a liquid delivery cycle (see Patent Documents 2 to 5).

An object of the present invention is to improve the accuracy of constant pressure control for suppressing thermal effect pulsation and to improve liquid delivery accuracy.

Solutions to the Problems

A liquid delivery pump according to the present invention includes a primary plunger pump, a secondary plunger pump fluidly connected in series downstream of the primary plunger pump, and a pressure sensor that detects a system pressure that is a pressure of a mobile phase delivered from an outlet of the secondary plunger pump. The liquid delivery pump is configured to alternately and continuously execute a primary discharge process in which the primary plunger pump performs discharge operation and a secondary discharge process in which the secondary plunger pump performs discharge operation. The liquid delivery pump includes a liquid delivery control part configured to execute first constant pressure control in a first constant pressure control term and to execute second constant pressure control in a second constant pressure control term, the first constant pressure control term is a term, which is in a liquid delivery cycle consisting of the primary discharge process and the secondary discharge process, in which the primary discharge process is executed, the second constant pressure control term is a part of a term in which the secondary discharge process is executed, and the second constant pressure control term is including a term that is continuous after the first constant pressure control term. The liquid delivery pump further includes a target pressure setting part configured to set a target pressure for the first constant pressure control and the second constant pressure control with reference to the system pressure in a term other than the second constant pressure control term in the term in which the secondary discharge process is executed. In the first constant pressure control, an operation amount of a combined flow rate, which is a flow rate obtained by subtracting a suction flow rate of the secondary plunger pump from a discharge flow rate of the primary plunger pump, is calculated using a first equation, and an operation speed of the primary plunger pump and/or the secondary plunger pump are/is adjusted so as to increase or decrease the combined flow rate by the calculated operation amount. In the second constant pressure control, an operation amount of a discharge flow rate of the secondary plunger pump is calculated using a second equation, and an operation speed of the secondary plunger pump is adjusted so as to increase or decrease a discharge flow rate of the secondary plunger pump by the calculated operation amount. The first equation includes at least a proportional term and an integral term of a pressure deviation that is a difference between the target pressure and the system pressure, and the second equation includes at least a proportional term of the pressure deviation, and degree of contribution of an integral term of the pressure deviation in the second equation is smaller than that in the first equation.

As described above, the liquid delivery pump targeted by the present invention is a liquid delivery pump of a series double plunger system in which two plunger pumps (the primary plunger pump and the secondary plunger pump) are fluidly connected in series to each other, and a primary discharge process in which the primary plunger pump performs discharge operation and a secondary discharge process in which the secondary plunger pump performs discharge operation are alternately and continuously executed. In such a liquid delivery pump, since thermal effect pulsation occurs due to a flow rate loss caused by heat generation of a mobile phase during a pre-pressurizing process of the primary plunger pump, it is also conceivable that the thermal effect pulsation can be suppressed by executing constant pressure control for maintaining the system pressure constant only during the primary discharge process. However, when the constant pressure control is executed only in the term in which the primary discharge process is executed, it is learned that there is a problem that the pressure in a term (secondary discharge process) continuous after the primary discharge process is not stabilized quickly. In view of the above, in the present invention, a term in which the primary discharge process is executed is set as the first constant pressure control term, a term that is a part of the term in which the secondary discharge process is executed and includes a term continuing after the first constant pressure control term is set as the second constant pressure control term, and constant pressure control is executed in the first constant pressure control term and the second constant pressure control term.

Here, as a method of constant pressure control for maintaining the system pressure at a certain target pressure, PI control or PID control (D is a differential term) including a proportional term (P) and an integral term (I) of a pressure deviation that is a difference between the system pressure and the target pressure is generally employed. When transition is made from the primary discharge process to the secondary discharge process, a flow rate loss due to heat generation of a mobile phase during the pre-pressurizing process of the primary plunger pump converges. Nevertheless, when the PI control or the PID control is uniformly executed in the first constant pressure control term and the second constant pressure control term, it has been found that contribution of the integral term (I) becomes excessive in a term continuous after the first constant pressure control term, and an overshoot of the system pressure occurs.

In the present invention, in order to solve the above problem, the first constant pressure control using the first equation is executed in the first constant pressure control term, the second constant pressure control using the second equation is executed in the second constant pressure control term, and degree of contribution of the integral term in the second equation is made smaller than degree of contribution of the integral term in the first equation.

A liquid chromatograph according to the present invention includes a separation column for separating a sample into individual components, an analysis channel leading to the separation column, the liquid delivery pump described above for delivering a mobile phase in the analysis channel, a sample injector that injects the sample into the mobile phase flowing through the analysis channel upstream of the separation column, and a detector that is fluidly connected downstream of the separation column and detects the components separated in the separation column.

Effects of the Invention

In the liquid delivery pump according to the present invention, a term in which a primary discharge process is executed is set as a first constant pressure control term, a term that is a part of a term in which a secondary discharge process is executed and includes a term continuing after the first constant pressure control term is set as a second constant pressure control term, first constant pressure control using a first equation is executed in the first constant pressure control term, second constant pressure control using a second equation is executed in the second constant pressure control term, and degree of contribution of an integral term in the second equation is made smaller than degree of contribution of an integral term in the first equation. Therefore, accuracy of constant pressure control for suppressing thermal effect pulsation can be improved and liquid delivery accuracy can be improved.

Since a liquid chromatograph according to the present invention includes the above-described liquid delivery pump, liquid delivery accuracy of a mobile phase is improved, and reproducibility of analysis is improved.

EMBODIMENTS OF THE INVENTION

Hereinafter, an embodiment of a liquid delivery pump and a liquid chromatograph according to the present invention will be described with reference to the drawings.

Figure 1:
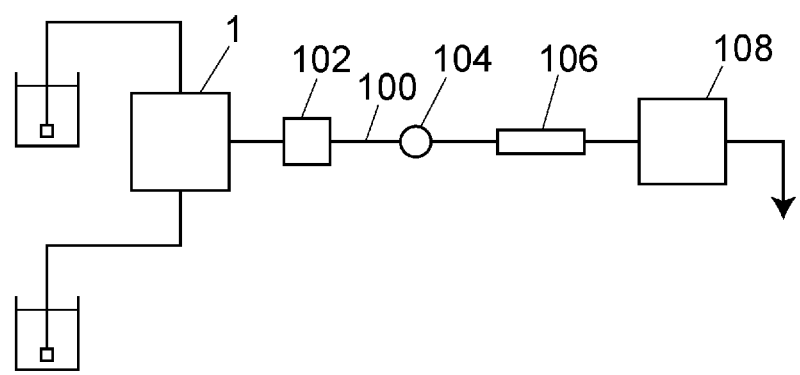
FIG. 1 is a schematic configuration diagram illustrating an example of a liquid chromatograph including a liquid delivery pump.

First, an embodiment of the liquid chromatograph will be described with reference to FIG. 1.

The liquid chromatograph includes a binary pump 1 for delivering a mobile phase in an analysis channel 100. The binary pump 1 includes two liquid delivery pumps 2A and 2B (see FIG. 2), and can deliver two types of mobile phases at a preset ratio by the liquid delivery pumps 2A and 2B. A mixer 102, a sample injector 104, a separation column 106, and a detector 108 are provided on the analysis channel 100. Note that the mixer 102 may be a part of constituents of the binary pump 1.

The two types of mobile phases delivered by the binary pump 1 are mixed in the mixer 102 and then flow through the analysis channel 100. The sample injector 104 injects a sample into a mobile phase flowing through the analysis channel 100. The sample injected into the mobile phase by the sample injector 104 is introduced into the separation column 106, and each component contained in the sample is temporally separated and sequentially eluted from the separation column 106. The components sequentially eluted from the separation column 106 are detected by the detector 108.

Figure 2:
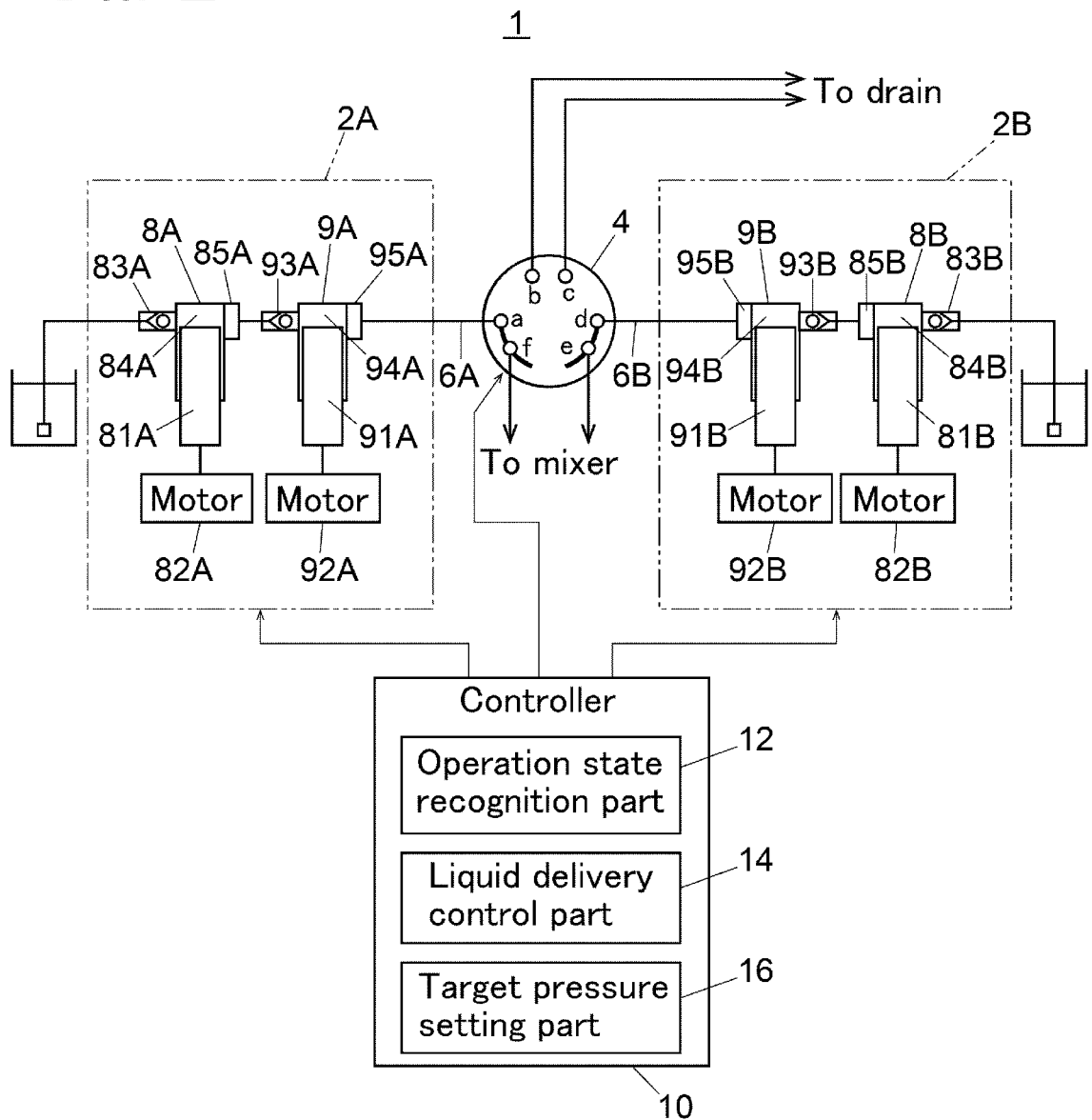
FIG. 2 is a schematic configuration diagram illustrating an embodiment of the liquid delivery pump.

FIG. 2 illustrates a schematic configuration of the binary pump 1.

The binary pump 1 includes two of the liquid delivery pumps 2A and 2B, a switching valve 4, and a controller 10. The liquid delivery pump 2A is connected to a port a of the switching valve 4 via a flow path 6A, and the liquid delivery pump 2B is connected to a port d of the switching valve 4 via a flow path 6B.

The switching valve 4 includes six ports a to f. A channel leading to the drain is connected to the ports b and c, and a channel leading to the mixer 102 (see FIG. 1) is connected to the ports e and f. The switching valve 4 can switch between a state in which the liquid delivery pumps 2A and/or 2B are fluidly connected to the mixer 102 (state of FIG. 2) and a state in which one of the liquid delivery pumps 2A and 2B is fluidly connected to the drain.

The liquid delivery pumps 2A and 2B have the same configuration, and two plunger pumps connected in series operate complementarily to realize continuous liquid delivery.

The liquid delivery pump 2A includes a primary plunger pump 8A and a secondary plunger pump 9A. A plunger 81A (hereinafter, the primary plunger 81A) of the primary plunger pump 8A is driven by a motor 82A, and a plunger 91A (hereinafter, the secondary plunger 91A) of the secondary plunger pump 9A is driven by a motor 92A. A check valve 83A is provided in an inlet portion to a pump chamber 84A of the primary plunger pump 8A, and a primary pressure sensor 85A is provided in an outlet portion from the pump chamber 84A. A check valve 93A is provided between an outlet of the pump chamber 84A of the primary plunger pump 8A and an inlet of a pump chamber 94A of the secondary plunger pump 9A, and a secondary pressure sensor 95A is provided in an outlet portion from the pump chamber 94A. The primary pressure sensor 85A is for detecting pressure in the pump chamber 84A of the primary plunger pump 8A, and the secondary pressure sensor 95A is for detecting liquid delivery pressure by the liquid delivery pump 2A. In a state where the liquid delivery pump 2A is connected to the mixer 102, the liquid delivery pressure by the liquid delivery pump 2A is substantially equal to a system pressure in the analysis channel 100. Therefore, the secondary pressure sensor 95A constitutes a system pressure sensor that detects a system pressure.

The liquid delivery pump 2B includes a primary plunger pump 8B and a secondary plunger pump 9B. A plunger 81B (hereinafter, the primary plunger 81B) of the primary plunger pump 8B is driven by a motor 82B, and a plunger 91B (secondary plunger 91B) of the secondary plunger pump 9B is driven by a motor 92B. A check valve 83B is provided in an inlet portion to a pump chamber 84B of the primary plunger pump 8B, and a primary pressure sensor 85B is provided in an outlet portion from the pump chamber 84B. A check valve 93B is provided between an outlet of the pump chamber 84B of the primary plunger pump 8B and an inlet of a pump chamber 94B of the secondary plunger pump 9B, and a secondary pressure sensor 95B is provided in an outlet portion from the pump chamber 94B. The primary pressure sensor 85B is for detecting pressure in the pump chamber 84B of the primary plunger pump 8B, and the secondary pressure sensor 95B is for detecting liquid delivery pressure by the liquid delivery pump 2B. In a state where the liquid delivery pump 2B is connected to the mixer 102, the liquid delivery pressure by the liquid delivery pump 2B is substantially equal to a system pressure in the analysis channel 100. Therefore, the secondary pressure sensor 95B constitutes a system pressure sensor that detects a system pressure.

The operation of the liquid delivery pumps 2A and 2B is controlled by the controller 10. The controller 10 is realized by a dedicated computer or a general-purpose personal computer including a central processing part (CPU), an information storage device, and the like. The controller 10 includes an operation state recognition part 12, a liquid delivery control part 14, and a target pressure setting part 16. The operation state recognition part 12, the liquid delivery control part 14, and the target pressure setting part 16 are functions realized by the CPU executing a program stored in the information storage device.

The operation state recognition part 12 is configured to recognize a process executed by each of the liquid delivery pumps 2A and 2B and the positions of the plungers 81A, 91A, 81B, and 91B as an operation state of each of the liquid delivery pumps 2A and 2B based on a driving signal given to the motors 82A, 92A, 82B, and 92B that drive the plunger pumps 8A, 9A, 8B, and 9B.

The liquid delivery control part 14 performs operation control of the plunger pumps 8A, 9A, 8B, and 9B so that the liquid delivery pumps 2A and 2B perform continuous liquid delivery at a set flow rate on the basis of an operation state of the liquid delivery pumps 2A and 2B recognized by the operation state recognition part 12. The operation control part 14 operates the plunger pumps 8A, 9A, 8B, and 9B in a cycle described below.

Figure 3:
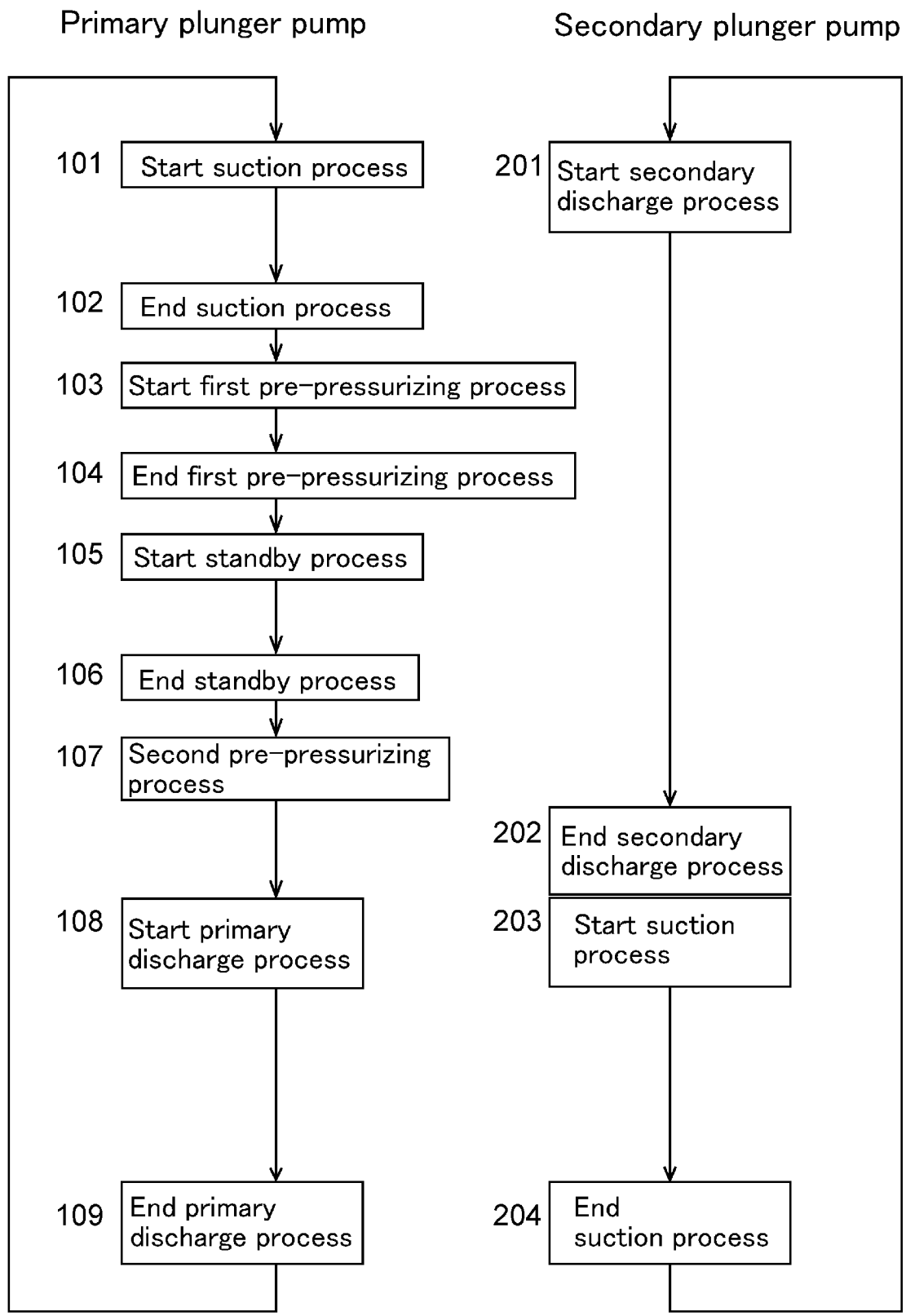
FIG. 3 is a flowchart for explaining operation cycles of a primary plunger pump and a secondary plunger pump of each liquid delivery pump of the embodiment.

An operation cycle of the liquid delivery pumps 2A and 2B will be described with reference to FIG. 2 and the flowchart of FIG. 3. Note that, since the operation cycles of the liquid delivery pumps 2A and 2B are the same, only the operation cycle of the liquid delivery pump 2A will be described here.

The liquid delivery pump 2A realizes continuous liquid delivery by alternately and continuously executing a primary discharge process in which the primary plunger pump 8A performs discharge operation and a secondary discharge process in which the secondary plunger pump 9A performs discharge operation. In the primary discharge process, a combined flow rate of the primary plunger pump 8A and the secondary plunger pump 9A, that is, a flow rate obtained by subtracting a suction flow rate of the secondary plunger pump 9A from a discharge flow rate of the primary plunger pump 8A is a liquid delivery flow rate of the liquid delivery pump 2A. In contrast, in the secondary discharge process, a discharge flow rate of the secondary plunger pump 9A becomes a liquid delivery flow rate of the liquid delivery pump 2A.

When the secondary plunger pump 9A starts the secondary discharge process (Step 201), the primary plunger pump 8A starts a suction process (Step 101). When the suction process ends (Step 102), the primary plunger pump 8A starts a first pre-pressurizing process (Step 103). In the first pre-pressurizing process, the pressure in the pump chamber 84A detected by the primary pressure sensor 85A is increased to a pressure higher than the atmospheric pressure and lower than the system pressure detected by the secondary pressure sensor 95A by a first specified value. The first specified value is a value of 50% or less (for example, 20%, 10%, 5%, or 2%) of the system pressure. Here, in the present embodiment, the "suction process" includes a top dead center standby process in which the primary plunger 81A temporarily stops at the top dead center and a bottom dead center standby process in which the primary plunger 81A temporarily stops at the bottom dead center. Note that the top dead center standby process and the bottom dead center standby process are not essential processes.

After the first pre-pressurizing process is finished (Step 104), the primary plunger pump 8A proceeds to a standby process (Step 105). In the standby process, the operation of the first plunger 81A is substantially stopped, and the pressure in the pump chamber 84A is maintained at the pressure when the first pre-pressurizing process is finished. This standby process is continued until the secondary plunger 91A reaches a predetermined position except for an exceptional case. The exceptional case is a case where the execution time of the standby process is shortened so that execution time zones of the primary discharge processes of the liquid delivery pumps 2A and 2B do not overlap each other. When the secondary plunger 91A reaches the predetermined position, the primary plunger pump 8A ends the standby process and proceeds to a second pre-pressurizing process (Step 107). In the second pre-pressurizing process, the primary plunger pump 8A is caused to perform discharge operation to increase the pressure in the pump chamber 84A. When the pressure in the pump chamber 84A reaches a pressure lower than the system pressure by a second specified value, transition is made from the second pre-pressurizing process to the primary discharge process (Step 108). At this time, the secondary plunger pump 9A ends the secondary discharge process (Step 202), and proceeds to the suction process (Step 203). Here, the second specified value is a value of 5% or less (for example, 2%, 1%, 0.5%, or 0.2%) of the system pressure. When the primary discharge process of the primary plunger pump 8A ends (Step 109), the secondary plunger pump ends the suction process and proceeds to the secondary discharge process (Steps 204 and 201).

As described above, in the liquid delivery pumps 2A and 2B, the primary plunger pumps 8A and 8B execute the suction process, the first pre-pressurizing process, the standby process, and the second pre-pressurizing process while the secondary plunger pumps 9A and 9B execute the secondary discharge process.

Figure 4:
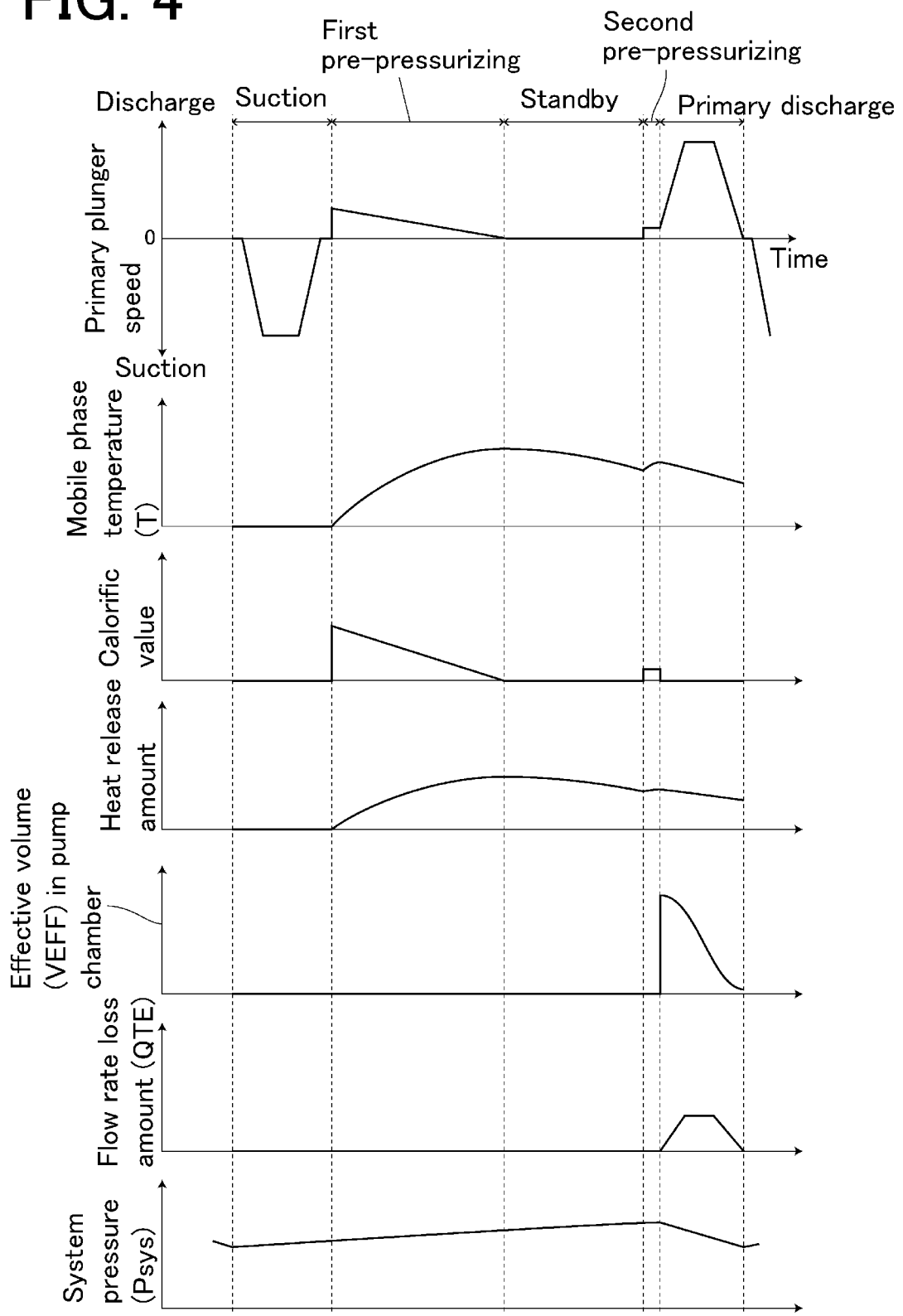
FIG. 4 illustrates various profiles for explaining a mechanism of thermal effect pulsation.

Here, thermal effect pulsation generated due to the pre-pressurizing process (the first pre-pressurizing process and the second pre-pressurizing process) of each of the liquid delivery pumps 2A and 2B will be described using a thermal effect profile of FIG. 4. In description below, the primary plunger pump 8A of the liquid delivery pump 2A will be described as an example. However, the same applies to the primary plunger pump 8B of the liquid delivery pump 2B. In FIG. 4, an uppermost stage is a speed profile of the primary plunger 81A, and a second stage from the top is a temperature profile of a mobile phase in the pump chamber 84A of the primary plunger pump 8A. Third and fourth stages from the top are profiles of a calorific value and a heat release amount of a mobile phase in the pump chamber 84A, respectively, and a fifth stage from the top is a profile of an effective volume in the pump chamber 84A. The profile of an effective volume is displayed only in a term of the primary discharge process related to the thermal effect pulsation. A sixth stage from the top is a profile of a loss amount of a liquid delivery flow rate by the primary plunger pump 8A, and a lowermost stage is a profile of the system pressure.

While the primary plunger pump 8A executes the suction process, a mobile phase temperature (T) in the pump chamber 84A is equal to room temperature. Here, the mobile phase temperature (T) at room temperature is defined as zero. When the first pre-pressurizing process is started, the mobile phase temperature (T) increases due to compression of a mobile phase in the pump chamber 84A of the primary plunger pump 8A. In this process, a calorific value of the mobile phase is proportional to the magnitude of a pressure increase per part time, and is similar to a speed profile of the primary plunger 81A. In contrast, a heat radiation amount from the mobile phase to a pump head of the primary plunger pump 8A is proportional to the mobile phase temperature (T). The mobile phase temperature (T) is determined by the balance between the calorific value and the heat release amount of the mobile phase.

In the standby process, since the compression and heat generation of the mobile phase are substantially stopped, heat release becomes dominant, and the mobile phase temperature (T) decreases. In the second pre-pressurizing process, since the mobile phase is compressed again in the pump chamber 84A of the primary plunger pump 8A, the mobile phase temperature (T) increases. In the subsequent primary discharge process, since the mobile phase is not compressed, heat release becomes dominant, and the mobile phase temperature (T) decreases. Further, the mobile phase discharged from the pump chamber 84A of the primary plunger pump 8A is cooled to room temperature when flowing through the pressure sensor 85A and a pipe.

Figure 5:
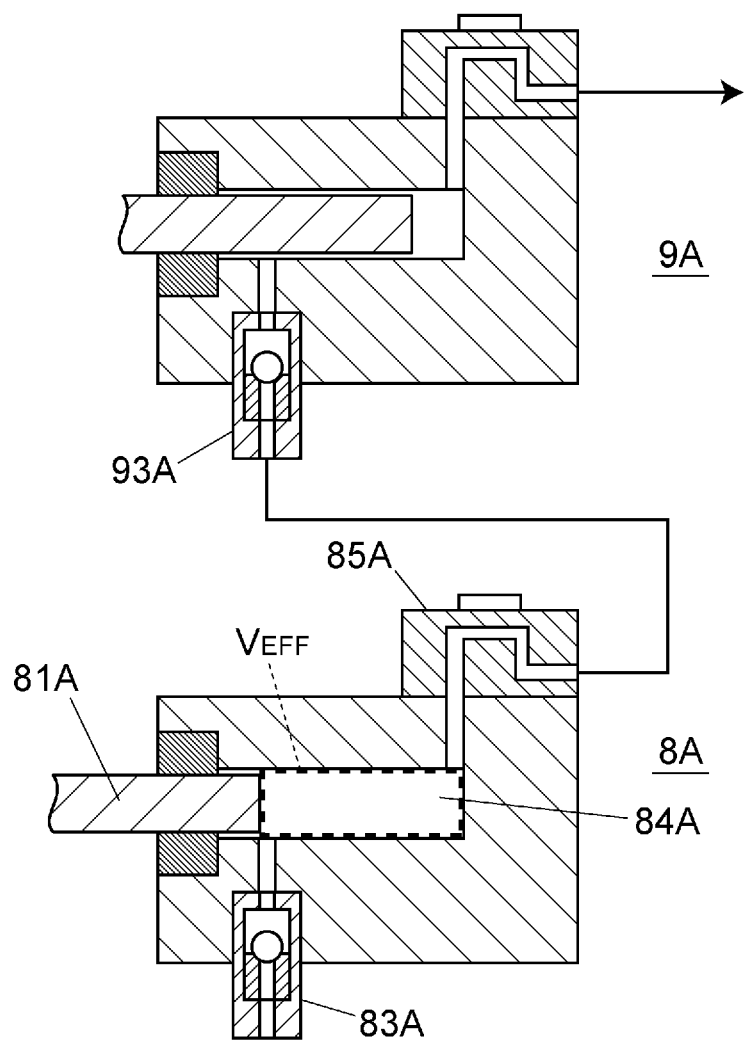
FIG. 5 is a cross-sectional configuration diagram of pump head portions of a primary plunger pump and a secondary plunger pump of the liquid delivery pump of the embodiment.

Here, description will be made with reference to FIG. 5 illustrating cross-sectional structures of pump head portions of the primary plunger pump 8A and the secondary plunger pump 9A. In the pre-pressurizing process (first pre-pressurizing process and second pre-pressurizing process) of the primary plunger pump 8A, a mobile phase existing between the check valve 83A provided in an inlet portion of the primary plunger pump 8A and the check valve 93A provided in an inlet portion of the secondary plunger pump 9A is compressed. However, it is necessary to consider a temperature increase due to the compression only for a mobile phase existing in a portion surrounded by a broken line in the pump chamber 84A of the primary plunger pump 8A. This is because a mobile phase existing in other portions is cooled in a relatively short time (with a small time constant) because of a short distance to a flow path wall surface, and easily reaches temperature equilibrium. Hereinafter, a volume of a portion where a temperature increase due to the compression needs to be considered is referred to as an effective volume $V_{EFF}$. When a thermal expansion coefficient of a mobile phase is $\beta$ and a temperature increase of the mobile phase is T, a thermal expansion volume stored (or left) in the pump chamber 84A can be expressed as $\beta T V_{EFF}$. From this, a loss amount $Q_{TE}$ of a liquid delivery flow rate of the liquid delivery pump 2A caused by a thermal effect can be expressed as the following equation:

$$Q_{TE} = -\frac{d}{dt}\beta\, T V_{EFF}$$

The above equation shows that both decrease in the mobile phase temperature T (natural cooling) and decrease in the effective volume $V_{EFF}$ (forced cooling) are converted into the loss amount $Q_{TE}$ of a liquid delivery flow rate due to a thermal effect. When such a loss of the liquid delivery flow rate exists, the system pressure periodically fluctuates as in the system pressure profile (slightly exaggerated) in the lowermost stage of FIG. 4. This is a generation mechanism of the thermal effect pulsation.

As can be seen from the profile of a loss amount of the liquid delivery flow rate in the second stage from the bottom of FIG. 4, the loss amount of the liquid delivery flow rate is generated only in the primary discharge process. In order to compensate for such a loss in the liquid delivery flow rate, for each of the liquid delivery pumps 2A and 2B, constant pressure control is executed in a term (constant pressure control term) including a term in which the primary discharge process is executed. The constant pressure control refers to controlling an operation speed of the primary plunger and/or the secondary plunger so that the system pressure becomes a preset target pressure. Specifically, an operation amount of the liquid delivery flow rate of the target liquid delivery pump 2A or 2B is calculated using a pressure deviation that is a difference between the target pressure and the system pressure, and the operation speed of the primary plunger and/or the secondary plunger is controlled so as to increase or decrease a combined flow rate of the primary plunger pump and the secondary plunger pump of the target liquid delivery pump 2A or 2B by the calculated operation amount.

Figure 6:
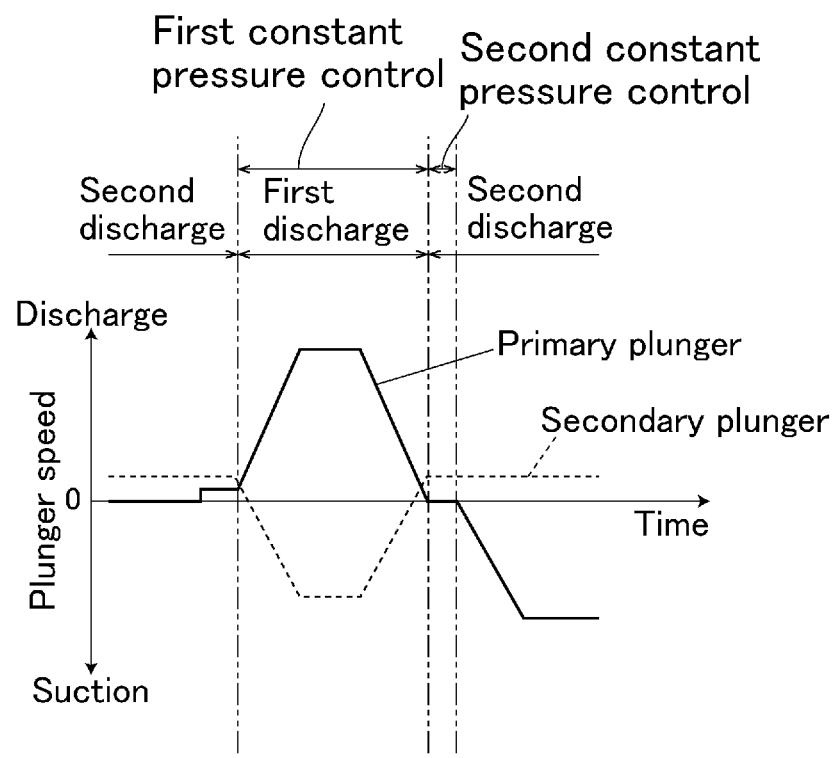
FIG. 6 is a conceptual diagram for explaining a constant pressure control term of the liquid delivery pump in the embodiment.

As illustrated in FIG. 6, the liquid delivery control part 14 is configured to set a term in which the primary discharge process is executed as a first constant pressure control term and a term that is a part of a term in which the secondary discharge process is executed and is continuous after the first constant pressure control term as a second constant pressure control term, execute first constant pressure control in the first constant pressure control term, and execute second constant pressure control in the second constant pressure control term. The first constant pressure control is control for calculating an operation amount $Q_{TC}$ of a liquid delivery flow rate using the first equation including an integral term $I_e$ of a deviation (hereinafter, pressure deviation $P_e$) between a system pressure $P_{sys}$ and a target pressure $P_{target}$. The second constant pressure control is control for calculating the operation amount $Q_{TC}$ of the liquid delivery flow rate using a second equation in which the integral term $I_e$ is not included or, even if included, the degree of contribution of the integral term $I_e$ to a calculation result is smaller than that of the first equation.

Note that, in the present embodiment, only a term that is a part of the term in which the secondary discharge process is executed and continuous after the first constant pressure control term is set as the second constant pressure control term. However, a term continuous before the first constant pressure control term may also be included in the second constant pressure control term. In this manner, even in a case where the pressure in the pump chamber 84A becomes higher than the system pressure in the second pre-pressurizing process and positive pulsation occurs in the system pressure, an effect of suppressing the positive pulsation can be obtained by the constant pressure control in the second constant pressure control term continuous before the first constant pressure control term.

The target flow rate setting part 16 is configured to set the target pressure $P_{target}$ used in the constant pressure control. The target pressure $P_{target}$ may be a system pressure immediately before the start of the constant pressure control term (the first constant pressure control term and the second constant pressure control term). Further, the target pressure $P_{target}$ may be determined by adding prediction of linear temporal transition with reference to the system pressure immediately before the start of the constant pressure control term. The setting method for the target pressure $P_{target}$ as described above is also disclosed in Patent Document 4.

The pressure deviation $P_e$ is calculated as a difference between the target pressure $P_{target}$ and the system pressure $P_{sys}$ as in the following equation:

$$P_e = P_{target} - P_{sys}$$

Further, the integral term $I_e$ and a differential term $D_e$ are derived from the pressure deviation $P_e$ by the following equation:

$$I_e = \int P_e\, dt$$

$$D_e = \frac{d}{dt} P_e$$

The first constant pressure control can be PID control using the following first equation:

$$Q_{TC} = K_P P_e + \frac{1}{T_i} I_e + T_d D_e$$

In contrast, the second constant pressure control can be PD control using the following second equation:

$$Q_{TC} = K_P P_e + T_d D_e$$

Note that the second equation does not include an integral term, that is, the degree of contribution of the integral term to the operation amount $Q_{TC}$ is zero. However, the second equation used for the second constant pressure control may also include the integral term $I_e$. In this case, the degree of contribution of the integral term $I_e$ included in the second equation is made smaller than the degree of contribution of the integral term $I_e$ of the first equation. This can be realized by making an integral gain $1/T_i$ in the second equation relatively smaller than an integral gain $1/T_i$ in the first equation. Further, although the first expression and the second expression include a differential term $T_d D_e$, the differential term $T_d D_e$ is not essential.

Here, $K_p$ is a proportional gain. $T_i$ is integral time and $1/T_i$ is called an integral gain. $T_d$ is called differential time or a differential gain. These coefficients may be constants or may be variable depending on an operating condition (flow rate, pressure, and the like) of the target delivery pump 2A or 2B.

Figure 7:
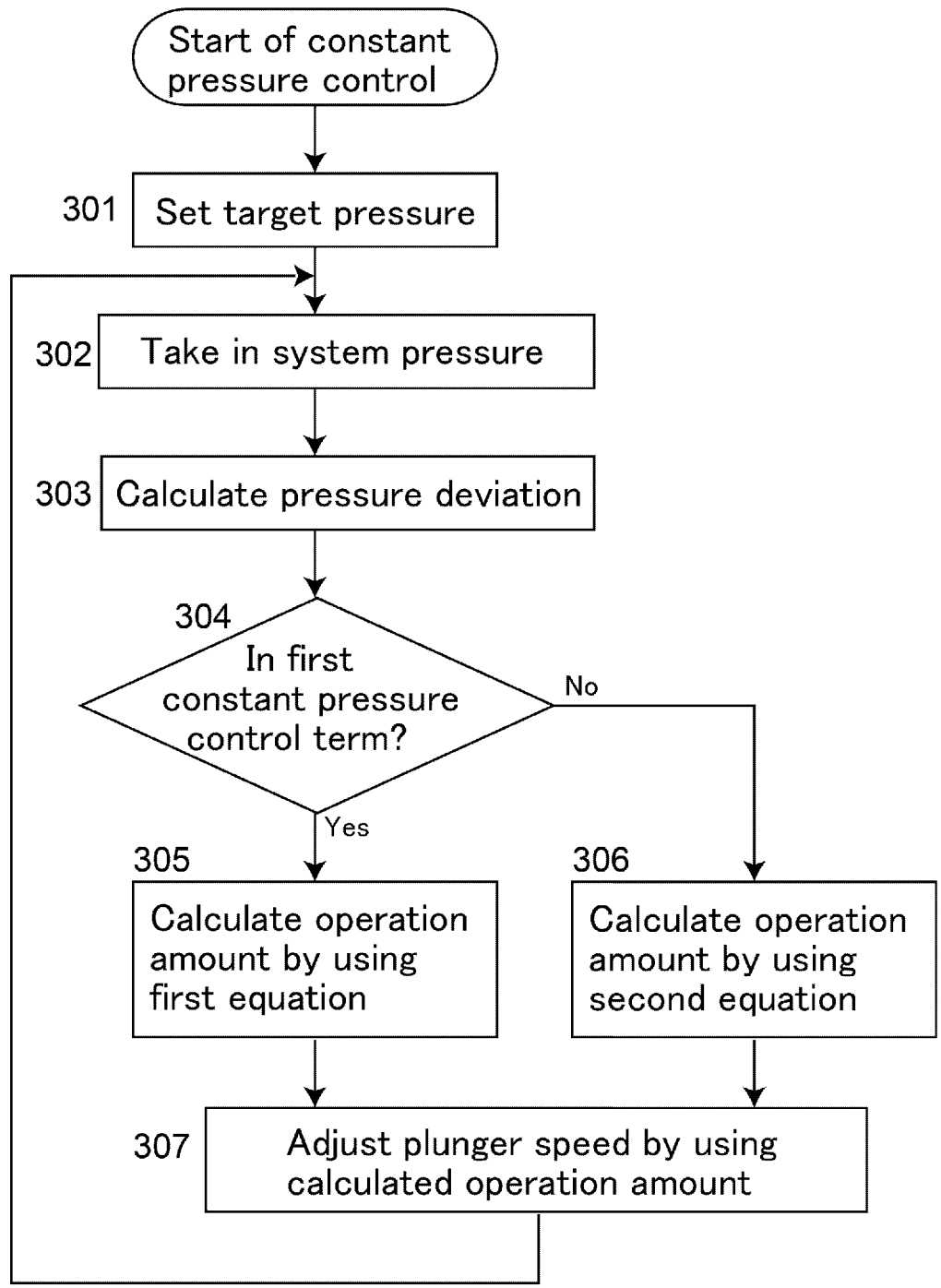
FIG. 7 is a flowchart for explaining constant pressure control executed in the embodiment.

The constant pressure control in the constant pressure control term will be described with reference to the flowchart of FIG. 7 together with FIG. 2. Note that, although description is made for the liquid delivery pump 2A here, the same applies to the liquid delivery pump 2B.

When an operation state of the liquid delivery pump 2A enters the constant pressure control term, the target pressure setting part 16 sets a target pressure based on the system pressure immediately before the operation state enters the constant pressure control term (Step 301). The controller 10 reads the system pressure $P_{sys}$ from the pressure sensor 95A in each control cycle of the liquid delivery pump 2A (Step 302). The liquid delivery control part 14 calculates the pressure deviation $P_e$ using the read system pressure $P_{sys}$ and the target pressure $P_{target}$ (Step 303). In a case where the operation state of the liquid delivery pump 2A is in the first constant pressure control term, the liquid delivery control part 14 calculates the operation amount $Q_{TC}$ of the liquid delivery flow rate using the first equation (Steps 304 and 305), and in a case where the operation state of the liquid delivery pump 2A is in the second constant pressure control term, the liquid delivery control part 14 calculates the operation amount $Q_{TC}$ of the liquid delivery flow rate using the second equation (Steps 304 and 306). Then, the liquid delivery control part 14 adjusts the operation speed of the primary plunger 81A and/or the secondary plunger 91A so as to increase or decrease a combined flow rate of the primary plunger pump 8A and the secondary plunger pump 9A of the liquid delivery pump 2A by the calculated operation amount $Q_{TC}$ (Step 307).

Figure 8:
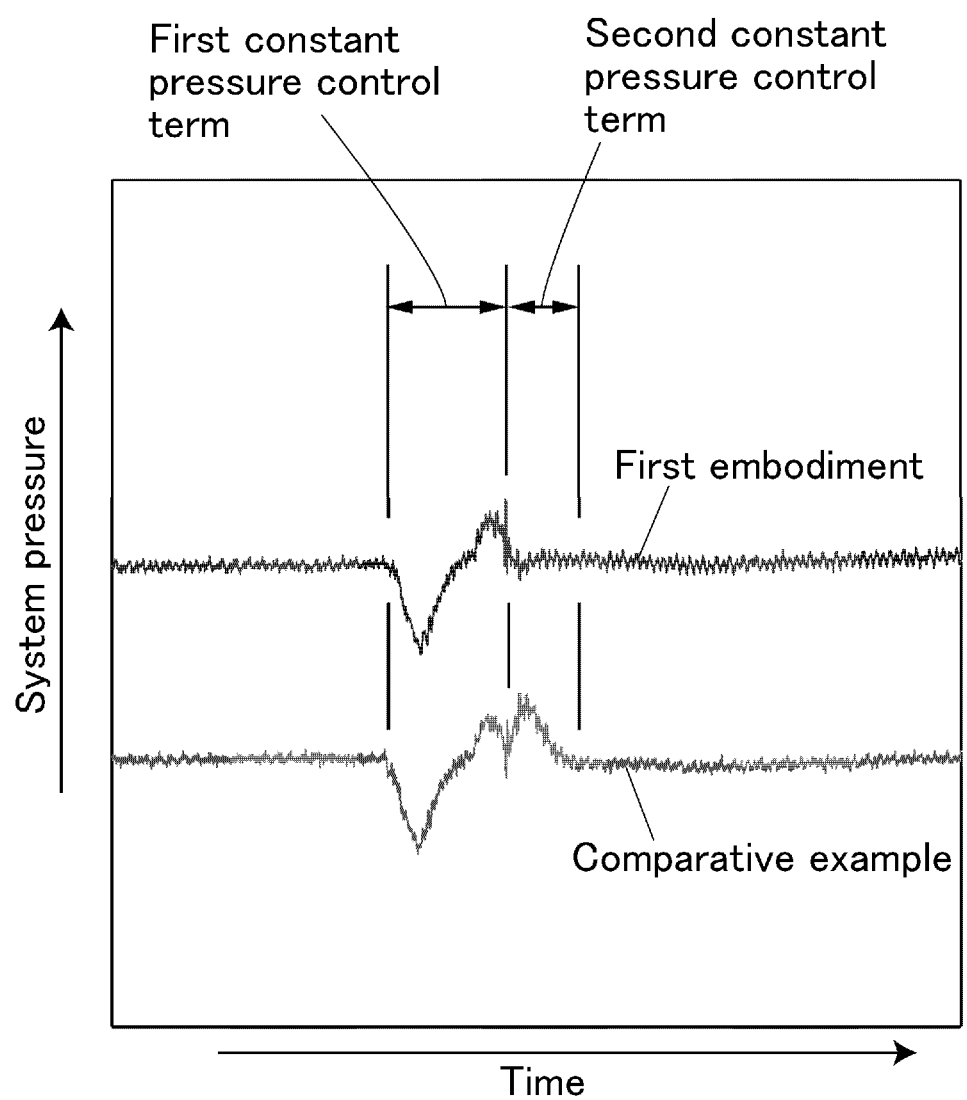
FIG. 8 is system pressure data showing a verification result of a suppression effect of a pressure fluctuation by constant pressure control.

FIG. 8 is system pressure data showing a verification result of a suppression effect of a pressure fluctuation by the constant pressure control. In this verification, the fluctuation degree of the system pressure is compared between a case (first embodiment) where the first constant pressure control (PID control) is executed in the first constant pressure control term and the second constant pressure control (PD control) using the second equation is executed in the second constant pressure control term, and a case (Comparative Example) where the first constant pressure control (PID control) using the first equation is executed in both the first constant pressure control term and the second constant pressure control term.

Comparison between the first embodiment and Comparative Example in FIG. 8 shows that the pressure deviation in the first embodiment is smaller than that in Comparative Example in the second constant pressure control term continuous after the first constant pressure control term (primary discharge process). The reason for this is described as below.

A main disturbance factor in this feedback group system is a flow rate loss due to a thermal effect. The flow rate loss continues while the liquid delivery pump 2A or 2B is in the primary discharge process. For this reason, in both waveforms of the first embodiment and Comparative Example in FIG. 8, a decrease in pressure is observed at the start of the primary discharge process (first constant pressure control term). After the above, when a time period of about the integral time $T_i$ elapses, the degree of contribution of the integral term $I_e$ increases, and recovery of the system pressure is observed.

When the operation of the liquid delivery pump 2A or 2B transitions from the primary discharge process to the suction process of the primary plunger pump 8A or 8B, the flow rate loss as a disturbance factor converges. At this time, when the PID control is continued as in the Comparative Example, the contribution of the integral term $I_e$ to the operation amount $Q_{TC}$ is maintained, and an overshoot of the pressure occurs. In contrast, in the first embodiment, when transition is made from the primary discharge process to the suction process of the primary plunger pump 8A or 8B, the integral term $I_e$ is invalidated and the processing transitions to the PD control, and the overshoot observed in the Comparative Example is suppressed. As described above, the degree of contribution of the integral term $I_e$ in the constant pressure control in the second constant pressure control term is made smaller than the degree of contribution of the integral term $I_e$ in the constant pressure control in the first constant pressure control term, so that the fluctuation of the system pressure can be suppressed.

Figure 9:
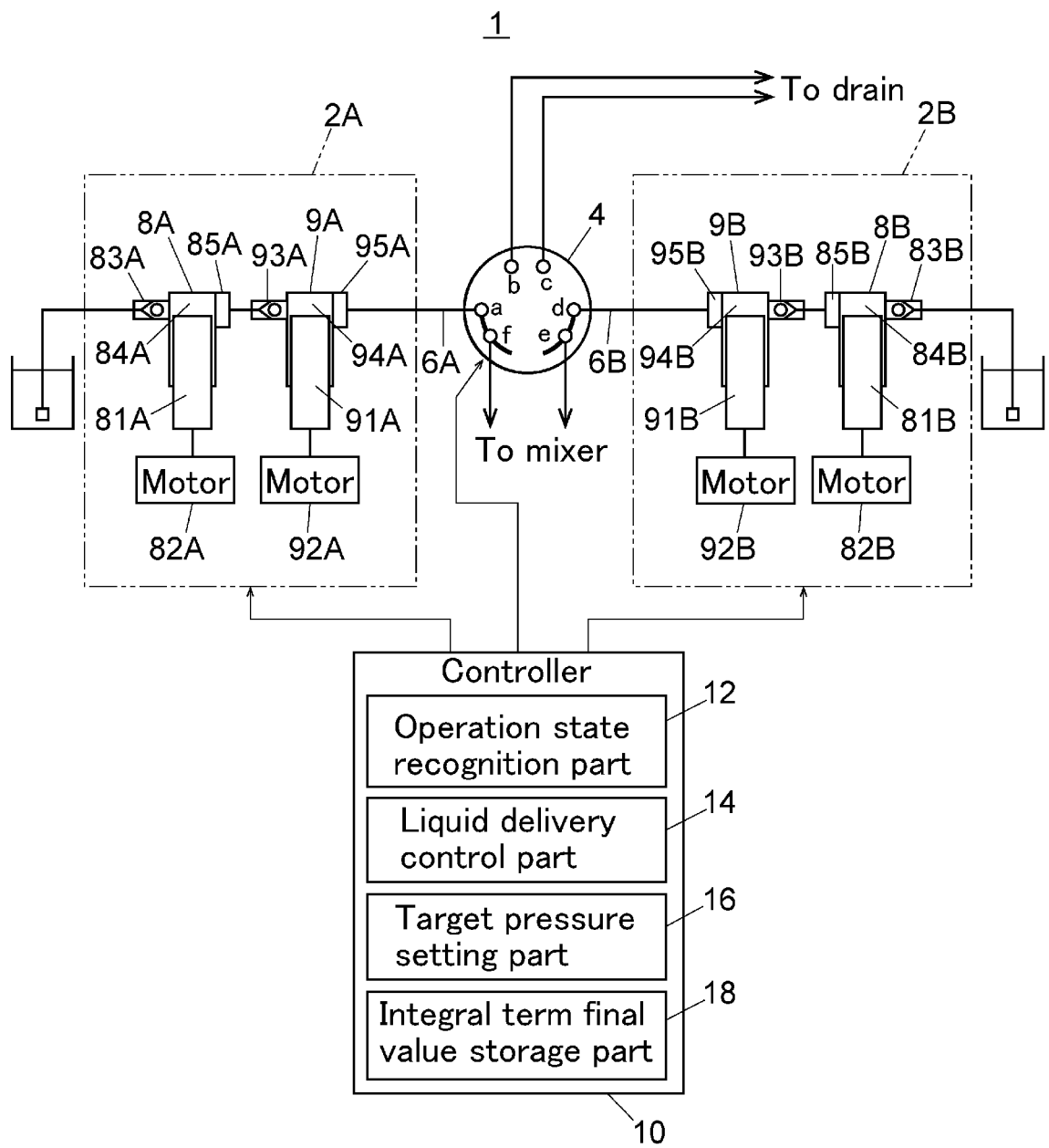
FIG. 9 is a schematic configuration diagram illustrating another embodiment of the liquid delivery pump.

In the PID control (or, PI control), the integral term $I_e$ is generally initialized to zero in each liquid delivery cycle. However, since the fluctuation of the system pressure due to the thermal effect is periodic, the pressure deviation $P_e$ does not greatly fluctuate depending on a liquid delivery cycle. In view of the above, the integral term $I_e$ of the constant pressure control in the constant pressure control term of a previous liquid delivery cycle may be at least partially taken over as an initial value of the integral term $I_e$ of the constant pressure control in the constant pressure control term of a next liquid delivery cycle. That is, as illustrated in FIG. 9, the controller 10 may include an integral term final value storage part 18 that stores a final value of the integral term $I_e$ in the constant pressure control term, and the liquid delivery control part 14 may use at least a part (for example, 50%, 100%, or the like) of a final value of the integral term $I_e$ in the constant pressure control term of a previous liquid delivery cycle stored in the integral term final value storage part 18 as an initial value of the integral term $I_e$ in the constant pressure control term of a next liquid delivery cycle.

Further, the integral gain in the first equation is not necessarily constant in the first constant pressure control term. That is, the first equation may include a forming coefficient A as in the following equation:

$$Q_{TC} = K_P P_c + \frac{A}{T_i} I_c + T_d D_c$$

Figure 10:
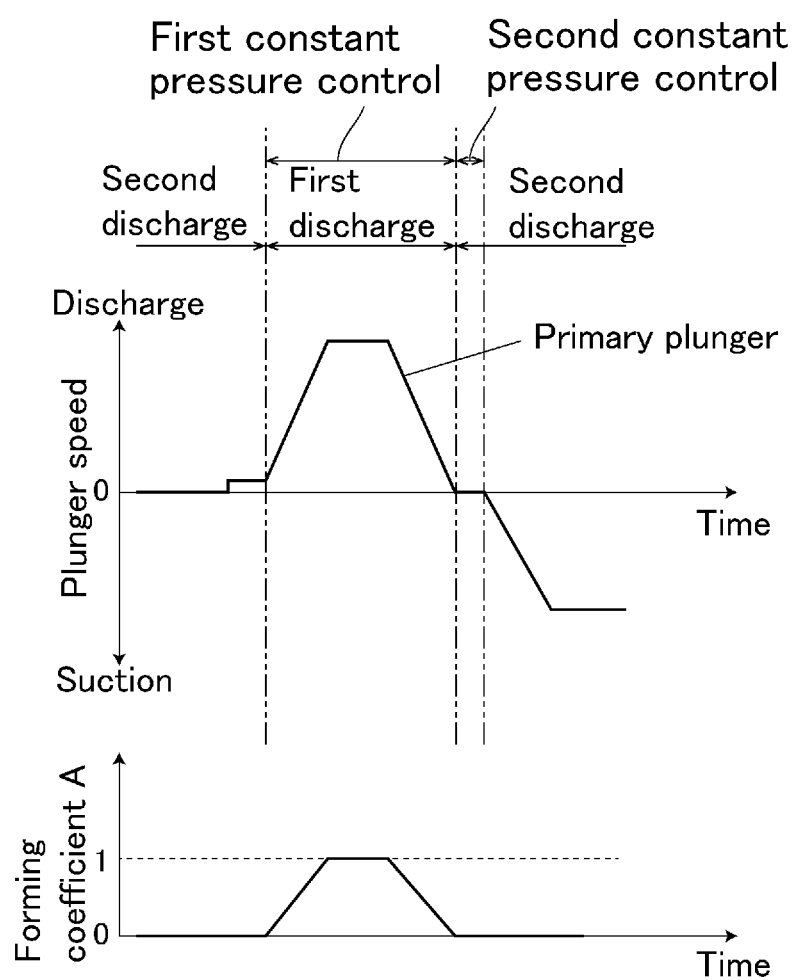
FIG. 10 is a graph showing an example of a temporal change of a forming coefficient in a first equation.

As illustrated in FIG. 10, the forming coefficient A of the first equation can be set to change between 0 and 1 in proportion to the operation speed in the first discharge process of the primary plunger 81A or 81B of the target liquid delivery pump 2A or 2B. Since the loss amount $Q_{TC}$ of the liquid delivery flow rate varies substantially in proportion to the operation speed of the primary plunger during the primary discharge process, the degree of contribution of the integral term $I_e$ in the first equation is also made proportional to the operation speed of the primary plunger, so that the constant pressure control with higher accuracy can be realized.

Figure 11:
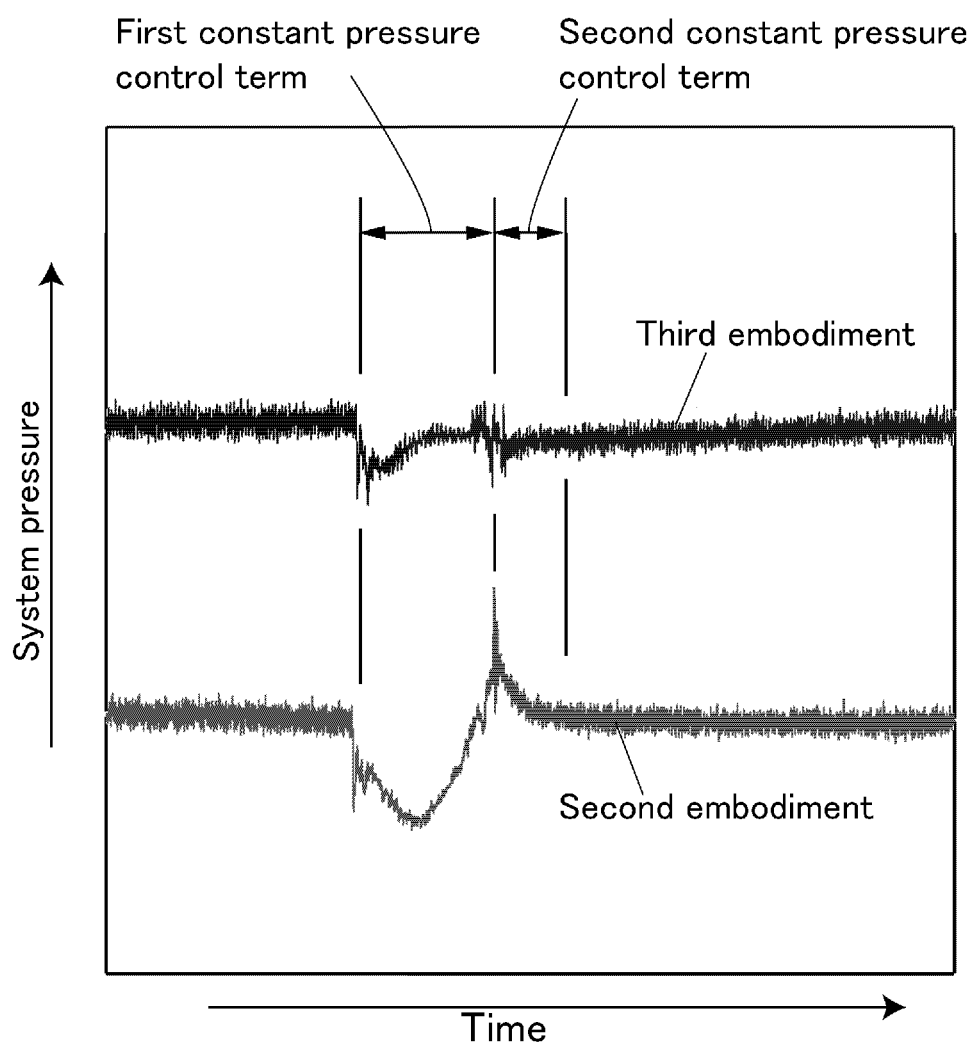
FIG. 11 is system pressure data showing a verification result of a suppression effect of a pressure fluctuation by improved constant pressure control.

FIG. 11 illustrates a verification result of a suppression effect of a fluctuation of the system pressure by using the first equation including the forming coefficient A in the first constant pressure control and using a part of a final value of the integral term $I_e$ of the first constant pressure control in a previous liquid delivery cycle as an initial value of the integral term $I_e$ of the first constant pressure control. In a second embodiment of FIG. 11, the PID control is performed using the first equation not including the forming coefficient A in the first constant pressure control term, and the integral term $I_e$ is initialized to zero in each liquid delivery cycle. In contrast, in a third embodiment, the PID control is performed using the first equation including the forming coefficient A in the first constant pressure control term, and a part (50%) of a final value of the integral term $I_e$ in the first constant pressure control term of a previous liquid delivery cycle is used as an initial value of the integral term $I_e$ of the PID control. In the second constant pressure control term, the PD control using the second equation not including the integral term $I_e$ is performed in both the second and third embodiments.

Comparison between the waveforms of the second embodiment and the third embodiment in FIG. 11 shows that the pressure deviation in the first half of the first constant pressure control term (primary discharge process) is improved by integrating the forming coefficient A with the integral term $I_e$ of the PID control and using a final value of the integral term $I_e$ in the first constant pressure control term of a previous liquid delivery cycle as an initial value of the integral term $I_e$ in the constant pressure control of a next liquid delivery cycle. The reason for this is described as below.

As described above, in the second embodiment, the integral term $I_e$ is initialized to zero in each liquid delivery cycle. For this reason, the recovery of the system pressure is delayed until a time period of about the integral time $T_i$ elapses (until the degree of contribution of the integral term $I_e$ to the operation amount $Q_{TC}$ becomes large). In contrast, at a time point at which the primary discharge process ends, the contribution of the integral term $I_e$ in the calculation equation of the operation amount $Q_{TC}$ is dominant. That is, the integral term $I_e$ has information on the magnitude of a flow rate loss which is a disturbance factor. Since the flow rate loss is periodically reproduced, as in the third embodiment of FIG. 11, by at least partially taking over the integral term $I_e$ and further integrating a forming coefficient with the integral term $I_e$, the integral term $I_e$ can be effectively caused to contribute from immediately after the start of the primary discharge process, and the drop of the system pressure immediately after the start of the primary discharge process can be suppressed.

The embodiments described above merely illustrate examples of the embodiment of the liquid delivery pump and the liquid chromatograph according to the present invention. The embodiment of the liquid delivery pump and the liquid chromatograph according to the present invention is as described below.

The embodiment of the liquid delivery pump according to the present invention includes a primary plunger pump, a secondary plunger pump fluidly connected in series downstream of the primary plunger pump, and a pressure sensor that detects a pressure of a mobile phase delivered from an outlet of the secondary plunger pump as a system pressure. The liquid delivery pump alternately and continuously executes a primary discharge process in which the primary plunger pump performs discharge operation and a secondary discharge process in which the secondary plunger pump performs discharge operation. The liquid delivery pump includes a liquid delivery control part configured to set a term in which the primary discharge process is executed in a liquid delivery cycle including the primary discharge process and the secondary discharge process as a first constant pressure control term, set a term including a term that is a part of a term in which the secondary discharge process is executed and is continuous after the first constant pressure control term as a second constant pressure control term, execute first constant pressure control in the first constant pressure control term, and execute second constant pressure control in the second constant pressure control term, and a target pressure setting part configured to set a target pressure for the first constant pressure control and the second constant pressure control with reference to the system pressure in a term other than the second constant pressure control term in a term in which the secondary discharge process is executed. The first constant pressure control is control of calculating an operation amount of a combined flow rate, which is a flow rate obtained by subtracting a suction flow rate of the secondary plunger pump from a discharge flow rate of the primary plunger pump, by using a first equation, and adjusting an operation speed of the primary plunger pump and/or the secondary plunger pump so as to increase or decrease the combined flow rate by the calculated operation amount, the second constant pressure control is control of calculating an operation amount of a discharge flow rate of the secondary plunger pump by using a second equation and adjusting an operation speed of the secondary plunger pump so as to increase or decrease a discharge flow rate of the secondary plunger pump by the calculated operation amount, the first equation includes at least a proportional term and an integral term of a pressure deviation that is a difference between the target pressure and the system pressure, and the second equation includes at least a proportional term of the pressure deviation, and degree of contribution of an integral term of the pressure deviation in the second equation is smaller than that in the first equation.

In a first aspect of the above embodiment of the liquid delivery pump according to the present invention, degree of contribution of the integral term in the second equation is zero. According to such an aspect, contribution of the integral term is eliminated in a term other than the primary discharge process in which loss of a liquid delivery flow rate due to a thermal effect does not occur, and an overshoot of the system pressure due to contribution of the integral term can be suppressed.

In a second aspect of the above embodiment of the liquid delivery pump according to the present invention, the first equation and the second equation include a differential term of the pressure deviation. In such an aspect, the first constant pressure control is PID control, and the second constant pressure control is PD control.

In a third aspect of the above embodiment of the liquid delivery pump according to the present invention, the first equation includes a forming coefficient multiplied by the integral term, and the forming coefficient changes between 0 and 1 in proportion to an operation speed of a plunger of the primary plunger pump. Since a loss amount of a liquid delivery flow rate varies in conjunction with the operation speed of the plunger of the primary plunger pump during the primary discharge process, degree of contribution of the integral term in the first equation is also made in conjunction with the operation speed of the plunger, so that the constant pressure control with higher accuracy can be realized.

In a fourth aspect of the above embodiment of the liquid delivery pump according to the present invention, the second constant pressure control term includes a term continuous before the first constant pressure control term. In a pre-pressurizing process performed prior to the primary discharge process, the pressure in the pump chamber of the primary plunger pump becomes higher than the system pressure, and positive pulsation may be generated in the system pressure. Even in such a case, the positive pulsation can be suppressed by performing the second constant pressure control in the term continuous before the first constant pressure control term.

A fifth aspect of the above embodiment of the liquid delivery pump according to the present invention further includes an integral term final value storage part configured to store a final value of the integral term in a continuous constant pressure control term including the first constant pressure control term and the second constant pressure control term until a start point of the constant pressure control term of a next one of the liquid delivery cycle. The liquid delivery control part is configured to use the final value stored in the integral term final value storage part at least partially as an initial value of the integral term of a next one of the liquid delivery cycle for calculation of the operation amount. Since a flow rate loss is periodically reproduced, it is possible to effectively cause the integral term to contribute from immediately after the start of the primary discharge process of a next liquid delivery cycle by at least partially taking over the integral term of a previous liquid delivery cycle, and it is possible to suppress the drop of the system pressure immediately after the start of the primary discharge process.

An embodiment of a liquid chromatograph according to the present invention includes a separation column for separating a sample into individual components, an analysis channel leading to the separation column, the liquid delivery pump described above for delivering a mobile phase in the analysis channel, a sample injector that injects the sample into the mobile phase flowing through the analysis channel upstream of the separation column, and a detector that is fluidly connected downstream of the separation column and detects the components separated in the separation column.

DESCRIPTION OF REFERENCE SIGNS

1: Binary pump
2A, 2B: Liquid delivery pump
4: Switching valve
6A, 6B: Flow path
8A, 8B: Primary plunger pump
9A, 9B: Secondary plunger pump
10: Controller
12: Operation state recognition part
14: Liquid delivery control part
16: Target pressure setting part
18: Integral term final value storage part
81A, 81B: Primary plunger
82A, 82B, 92A, 92B: Motor
83A, 83B, 93A, 93B: Check valve
84A, 84B, 94A, 94B: Pump chamber
85A, 85B, 95A, 95B: Pressure sensor
100: Analysis channel
102: Mixer
104: Sample injector
106: Separation column
108: Detector

The invention claimed is:

1. A liquid delivery pump comprising:
a primary plunger pump;
a secondary plunger pump fluidly connected in series downstream of the primary plunger pump; and
a pressure sensor that detects a system pressure that is a pressure of a mobile phase delivered from an outlet of the secondary plunger pump,
wherein the liquid delivery pump is configured to alternately and continuously execute a primary discharge process in which the primary plunger pump performs discharge operation and a secondary discharge process in which the secondary plunger pump performs discharge operation,
the liquid delivery pump further comprising:
a liquid delivery control part configured to execute first constant pressure control in a first constant pressure control term and to execute second constant pressure control in a second constant pressure control term, wherein the first constant pressure control term is a term, which is in a liquid delivery cycle consisting of the primary discharge process and the secondary discharge process, in which the primary discharge process is executed, the second constant pressure control term is a part of a term in which the secondary discharge process is executed, and the second constant pressure control term is including a term that is continuous after the first constant pressure control term; and
a target pressure setting part configured to set a target pressure for the first constant pressure control and the second constant pressure control with reference to the system pressure in a term other than the second constant pressure control term in the term in which the secondary discharge process is executed, wherein
in the first constant pressure control, an operation amount of a combined flow rate, which is a flow rate obtained by subtracting a suction flow rate of the secondary plunger pump from a discharge flow rate of the primary plunger pump, is calculated using a first equation, and an operation speed of the primary plunger pump and/or the secondary plunger pump are/is adjusted so as to increase or decrease the combined flow rate by the calculated operation amount,
in the second constant pressure control, an operation amount of a discharge flow rate of the secondary plunger pump is calculated using a second equation, and an operation speed of the secondary plunger pump is adjusted so as to increase or decrease a discharge flow rate of the secondary plunger pump by the calculated operation amount, the first equation includes at least a proportional term and an integral term of a pressure deviation that is a difference between the target pressure and the system pressure, and the second equation includes at least a proportional term of the pressure deviation, and degree of contribution of an integral term of the pressure deviation in the second equation is smaller than that in the first equation.

2. The liquid delivery pump according to claim 1, wherein degree of contribution of the integral term in the second expression is zero.

3. The liquid delivery pump according to claim 1, wherein the first equation and the second equation include a differential term of the pressure deviation.

4. The liquid delivery pump according to claim 1, wherein
the first equation includes a forming coefficient multiplied by the integral term, and
the forming coefficient changes between 0 and 1 in proportion to an operation speed of a plunger of the primary plunger pump.

5. The liquid delivery pump according to claim 1, wherein the second constant pressure control term includes a term continuous before the first constant pressure control term.

6. The liquid delivery pump according to claim 1, further comprising:
an integral term final value storage part configured to store a final value of the integral term in a continuous constant pressure control term consisting of the first constant pressure control term and the second constant pressure control term until a start point of the constant pressure control term of a next one of the liquid delivery cycle, wherein
the liquid delivery control part is configured to use the final value stored in the integral term final value storage part at least partially as an initial value of the integral term of the next one of the liquid delivery cycle for calculation of the operation amount.

7. A liquid chromatograph comprising:
a separation column for separating a sample into individual components;
an analysis channel leading to the separation column;
the liquid delivery pump according to claim 1 for delivering a mobile phase in the analysis channel;
a sample injector that injects the sample into the mobile phase flowing through the analysis channel upstream of the separation column; and
a detector that is fluidly connected downstream of the separation column and detects the components separated in the separation column.

* * * * *